United States Patent [19]

Jacobson et al.

[11] Patent Number: 5,514,048

[45] Date of Patent: May 7, 1996

[54] INTERLOCKED CONTROL LEVER SYSTEM WITH ENGINE STARTING INTERLOCK CIRCUIT FOR AN OFF-HIGHWAY IMPLEMENT

[75] Inventors: Eric D. Jacobson, Downers Grove; Ralph D. Price, Plainfield, both of Ill.

[73] Assignee: Case Corporation, Racine, Wis.

[21] Appl. No.: 132,578

[22] Filed: Oct. 6, 1993

[51] Int. Cl.⁶ .............................. F02N 17/00; F16H 59/74
[52] U.S. Cl. .............................. 477/99; 340/457.3; 74/475
[58] Field of Search .............................. 74/475, 476, 335; 477/99; 340/453, 456, 457.3; 123/179.3; 200/43.03

[56] References Cited

U.S. PATENT DOCUMENTS

| | | | |
|---|---|---|---|
| 2,964,964 | 12/1960 | Craig | 74/473 |
| 3,381,269 | 4/1968 | Fierbaugh et al. | 340/457.3 X |
| 3,800,603 | 4/1974 | Hauser et al. | 74/475 X |
| 4,282,769 | 8/1981 | Sandruck | 74/475 |
| 4,519,266 | 5/1985 | Reinecke | 74/475 X |
| 4,542,721 | 9/1985 | Williams | 477/99 |
| 4,610,179 | 9/1986 | Parker | 74/473 R X |
| 4,649,768 | 3/1987 | Kusaka et al. | 74/484 |
| 4,660,430 | 4/1987 | Bortfeld et al. | 74/473 R X |
| 4,680,983 | 7/1987 | Brown | 74/474 |
| 4,966,044 | 10/1990 | Bowman et al. | 74/335 |
| 5,065,135 | 11/1991 | Leish-Monstevens et al. | 477/99 X |
| 5,188,070 | 2/1993 | Otsuka et al. | 477/99 X |
| 5,252,861 | 10/1993 | Steeby et al. | 477/99 X |

FOREIGN PATENT DOCUMENTS

| | | |
|---|---|---|
| 453453 | 12/1948 | Canada . |
| 858132 | 7/1979 | U.S.S.R. . |
| 783554 | 9/1957 | United Kingdom . |
| 2177764A | 1/1987 | United Kingdom . |

Primary Examiner—Dirk Wright
Assistant Examiner—Khoi Q. Ta
Attorney, Agent, or Firm—Rudnick & Wolfe

[57] ABSTRACT

A directional control system for an off-highway implement including a self-propelled engine with a transmission assembly connected thereto for operation in a multitude of speed ranges. The directional control system includes an electrical power source, and a directional selector that is movable to any of three different positions corresponding to forward, neutral, and reverse modes of operation for the implement. The directional control system includes a controller having forward and reverse actuators for conditioning the transmission assembly for operation in forward and reverse modes. The controller is also capable of conditioning the transmission assembly for operation in a neutral mode. An electrical system is connected between the power source and the controller for deriving the control signals used to condition the implement. The electrical system includes a sensor assembly for monitoring the position of the directional selector and for applying control signals to the controller as a function of the position of the directional selector. The electrical system further includes logic circuitry for permitting the actuators to condition the transmission assembly as long as the direction selector is positioned in a neutral position prior to its movement to either the forward or reverse positions. The electrical system further includes a starting circuit and logic circuitry for preventing starting of the engine until the directional selector is in a neutral position. The directional control system of the present invention is further configured to require purposeful movement of the directional selector before the implement will change between various modes of operation.

21 Claims, 4 Drawing Sheets

INTERLOCKED CONTROL LEVER SYSTEM WITH ENGINE STARTING INTERLOCK CIRCUIT FOR AN OFF-HIGHWAY IMPLEMENT

FIELD OF THE INVENTION

The present invention generally relates to off-highway transmission assemblies and, more particularly, to a single lever directional control system for positively conditioning a transmission assembly of an off-highway implement into any one of three modes of operation, such as forward/neutral/reverse.

BACKGROUND OF THE INVENTION

Off-highway implements, such as large heavy-duty self-propelled tractors and the like, typically incorporate both multi-speed and multi-range transmissions which are arranged in combination with each other to effectively act as a single transmission assembly which provides a wide range of operating conditions for the implement. Independent of the operating speed range chosen by the operator, conventional transmission assemblies for off-highway implements are selectively operable in forward, reverse and neutral modes of operation.

Until recently, operation of the implement in either a forward or reverse operating mode was effected by the operator using a fulcrumed foot pedal having linkage mechanisms into the transmission assembly. Later, a hand lever and electrical control arrangement, as disclosed in Case Corporation U.S. Pat. No. 4,966,044, was developed to facilitate controlling the forward/reverse mode of operation for the implement. This patented arrangement helped the operator control the implement as there are many different functions an operator must perform substantially simultaneously while operating heavy duty implements or equipment which makes it difficult to use the heretofore known foot pedal actuated devices for controlling the direction of the implement.

The hand lever arrangement disclosed in U.S. Pat. No. 4,966,844 uses a two-position over-center arrangement for controlling the direction of the implement. One position of the hand lever selects a forward mode of implement operation and the other hand lever position selects a reverse mode of operation for the implement. The hand lever was resiliently biased such that the lever would automatically move to condition the implement for either a forward or reverse mode of operation depending upon the over-center position of the lever.

To move the hand lever from one position to the other position and back, the hand lever had to be purposefully moved in two different directions. That is, to move the hand lever from one position to another required the operator to purposefully move the hand lever both upwards and sideways. In this manner, it was assured that the hand lever would not inadvertently move from one position to another position thus inadvertently changing the directional mode of operation of the implement. The hand lever is also connected to a electrical switch that detects the position of the lever and engages the transmission assembly to operate the implement in the mode selected by the operator.

The multi-speed transmission of the transmission assembly typically includes a shift mechanism which selectively allows the speed transmission to operate in any of four different speeds. For each speed, the multi-range transmission of the transmission assembly is selectively operable under the influence of another shift mechanism in any of four different ranges. Thus, the transmission assembly of the off-highway implement is selectively operable in any of sixteen different speed ranges. As will be appreciated by those skilled in the art, the gearing in the multi-speed and multi-range transmissions is such that the fourth speed range of the transmission assembly develops the highest ground speed for the implement. Because of the relatively high ground speeds obtainable by the implement when the transmission assembly is conditioned in a fourth speed range, it is inadvisable to allow the implement to operate in reverse when the transmission assembly is conditioned in a fourth speed range.

A cab region of the off-highway implement contains an operator's seat adjacent to which are the various shift levers for conditioning the transmission assembly, the hand mechanisms for setting the appropriate mode of operation for the implement, a steering column, and other implement control devices. As will be appreciated by those skilled in the art, the cab region of a typical off-highway implement has relatively tight space constraints. Upon leaving the cab region, an operator typically places the transmission shift mechanism in a neutral position corresponding to a neutral condition for the transmission assembly. The hand lever of the heretofore known directional control system, however, is normally biased into either a forward or reverse position. Because of the confined space constraints in the cab region of the implement, it is not unusual for an operator to inadvertently move either transmission shift mechanism from its neutral position upon entering or leaving the cab region. The problems with inadvertent displacement of either shift mechanism from a neutral position whereby conditioning the transmission assembly in other than a neutral condition while the directional control assembly is positioned to condition the implement for forward or reverse modes of operation are apparent and well known in the art especially when the engine of the implement is being started.

Thus, there is both a need and a desire for a directional control system for conditioning an off-highway implement in either forward, reverse or neutral modes of operation and which prevents the implement from starting when a directional selector of the directional control system is in other than a neutral position.

SUMMARY OF THE INVENTION

In view of the above, and in accordance with the present invention, there is provided a directional control system for an off-highway implement including a self-propelled engine with a transmission assembly connected thereto for operation in a multitude of speed ranges. The directional control system includes an electrical power source, and a directional control such as a selector lever that is movable to any of three different positions corresponding to forward, neutral, and reverse modes of operation for the implement. The directional control system further includes a controller having a forward actuator for conditioning the transmission assembly such that the implement operates in a forward mode and a reverse actuator for conditioning the transmission assembly such that the implement operates in a reverse mode. The controller is also capable of conditioning the transmission assembly for operation in a neutral mode of operation.

One aspect of the present invention relates to an electrical system which is connected between the power source and the controller for deriving the control signals used to condition the implement in forward, neutral or reverse modes of operation. The electrical system includes a sensor assembly for monitoring the position of the selector lever and for applying control signals to the controller as a function of the position of the directional selector lever. In one form of the invention, the electrical system permits the forward and reverse actuators of the controller to condition the transmission in forward and reverse modes of operation as long as the selector lever is positioned in a neutral position prior to movement of the selector lever to either the forward or reverse positions.

In a most preferred form of the invention, the sensor assembly for monitoring the position of the directional selector lever comprises a switch module that is connected to the electrical power source and is responsive to a switch actuator which moves with the selector lever between positions. The switch module preferably includes a forward reed switch which is connected to the forward actuator of the controller and which responds to the presence of the magnetic actuator when the selector lever is positioned in a forward position, a reverse reed switch which is connected to the reverse actuator of the controller and which responds to the presence of the switch actuator when the selector lever is positioned in the reverse position, and a neutral reed switch which responds to the presence of the switch actuator when the shift or selector lever is positioned in a neutral position. In a most preferred form of the invention, the switch module further includes a fourth switch which is responsive to movements of the directional selector lever from a neutral position.

In the preferred embodiment, the controller comprises an electro/hydraulic valve assembly for controlling fluid flow to the transmission assembly and thereby conditioning in which mode of operation the implement is operated. The valve assembly is operable under the influence of the forward and reverse actuators. The forward actuator of the controller preferably includes a relay that responds to electrical signals directed thereto from the switch module depending upon the position of the selector lever and which is connected to a solenoid valve which serves to position the valve assembly when energized. The reverse actuator of the controller likewise includes a relay that responds to electrical signals directed thereto from the switch module depending upon the position of the selector lever and which is connected to a solenoid valve which serves to position the valve assembly when energized.

The directional control system of the present invention is further characterized by the provision of various mechanisms for indicating particular conditions of operation of the implement. The directional control system preferably includes an alarm which provides a signal to the operator when a hand brake of the implement is applied and either the forward or reverse actuators of the controller are energized to condition the implement in forward or reverse modes of operation. Moreover, a visual indicator in the cab region of the implement is activated when the hand brake of the implement is applied. To alert the operator to a reverse mode of operation, the directional control system of the present invention further includes an indicator for providing a visual indication that the direction selector lever is in a position to condition the transmission assembly to operate in a reverse mode of operation. Moreover, an indicator is provided for alerting the operator that the fourth speed range for the transmission is unobtainable as long as the selector lever is positioned in the reverse position to operate the implement in a reverse mode.

The directional control system of the present invention is configured to prevent the implement from operating in a reverse mode of operation while the transmission assembly is conditioned in a fourth speed range. To effect such ends, the electrical system includes an apparatus for detecting when the transmission assembly is shifted into a fourth speed range. The detecting apparatus is connected to the reverse switch of the switch module and to the reverse actuator. When the directional selector lever is moved to a reverse position and the transmission assembly is conditioned into a fourth speed range, the detecting apparatus changes state whereby disabling the reverse actuator and thereby preventing energization of the reverse actuator of the controller. Thus, the transmission assembly will not be permitted to operate in the fourth speed range as long as the selector lever remains in the reverse position to condition the implement for operation in reverse mode.

In a preferred form of the present invention, the directional control system further includes a starting circuit connected to the power source for starting the self-propelled engine of the implement. The electrical system of the directional control system further comprises circuitry for disabling the starting circuit from starting the engine when the sensor assembly monitors that the directional selector lever is in other than a neutral position. In a preferred form, the starting circuit is connected to the electrical power source and includes a relay connected to a key switch and to the fourth switch in the switch module that responds to movements of the selector lever relative to a neutral position. The starting circuit is completed when the key switch is closed and the switch module detects that the selector lever remains in a neutral position. If the selector lever is in other than a neutral position, the starting circuit is disabled thus preventing starting of the engine until the selector lever is returned to a neutral position.

Another aspect of the present invention relates to structure for positively positioning the selector lever of the directional control system in any one of forward, neutral, and reverse positions corresponding to forward, neutral, and reverse modes of operation for the off-highway implement. A first end of the selector lever is swivably mounted in the housing and a second end of the selector lever extends through an opening or gate to facilitate selective movement of the selector lever to each of a plurality of settings corresponding to the different modes of operation of the implement.

In a most preferred form of the invention, the first end of the selector is rockable about a first axis defined by a shaft supported in the housing. The selector lever is pivotally connected to the shaft for movement about a second axis extending generally normal to the first axis. The gate or opening defines three spaced detents arranged in side-by-side relation relative to each other with the center detent corresponding to the neutral mode of operation of the implement and the other two detents corresponding to the forward and reverse modes of implement operation. Each of the detents is configured such that two distinct movements need to be imparted to the selector lever to change position of the selector lever and thus change the mode of implement operation. The center or neutral detent has rollers mounted on opposite sides of the ingress opening thereto. Moreover, a spring is connected to the housing and to the selector lever intermediate the ends thereof in general alignment with the shaft and the neutral detent for normally urging the selector lever toward the neutral position and impeding the selector lever from moving to either the forward or reverse detent until purposefully moved by the operator to change the mode of operation of the implement from a neutral mode of operation.

The directional control system of the present invention positively positions the directional selector lever in any one of forward, neutral, or reverse positions thereby facilitating precise and convenient control of implement operation in either forward, neutral, or reverse modes. The gate through which the selector lever passes is designed to promote movement of the selector lever to a neutral position corresponding to a neutral mode of operation for the implement and is configured to require purposeful movement of the selector lever into and from either the forward or reverse detents to change the mode of operation of the implement. If the starting circuit is bypassed in an attempt to jump start the engine of the implement, the electrical system of the directional control system will disable the controller thereby disabling the transmission assembly from moving the implement until the selector lever is returned to a neutral position corresponding to the neutral condition for the implement. In a preferred form of the invention, the electrical system of the directional control system furthermore prevents operation of the implement in a reverse mode of operation as long as the selector lever is positioned in a reverse position and the transmission assembly is conditioned for operation in a fourth speed range. Various indicators and alarms arranged in combination with the directional control system provide visual and audible indications of various operating conditions of the implement.

These and numerous other objects, aims, and advantages of the present invention will become readily apparent from the following detailed description, appended claims, and the accompanying drawings.

DETAILED DESCRIPTION OF A PREFERRED EMBODIMENT

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Figure 1:
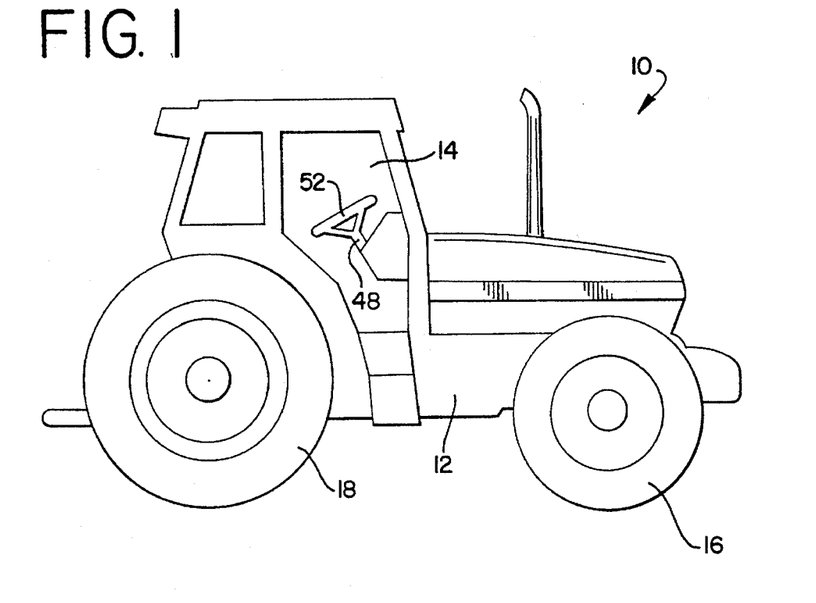
FIG. 1 is a schematic side elevational view of an off-highway implement to which the present invention may be applied.

Referring now to the drawings, wherein like reference numerals indicate like parts throughout the several views, the present invention is embodied in an off-highway implement such as a tractor 10 or the like. The tractor 10 includes a mobile frame 12 having an operator station or cab region 14 and which is supported for movement across a field by front and rear pairs of wheels 16 and 18, respectively. In the illustrated embodiment, the front pair of wheels 16 are steerable to provide direction to the implement 10 while the rear pair of wheels 18 act as drive wheels for the implement.

Figure 2:
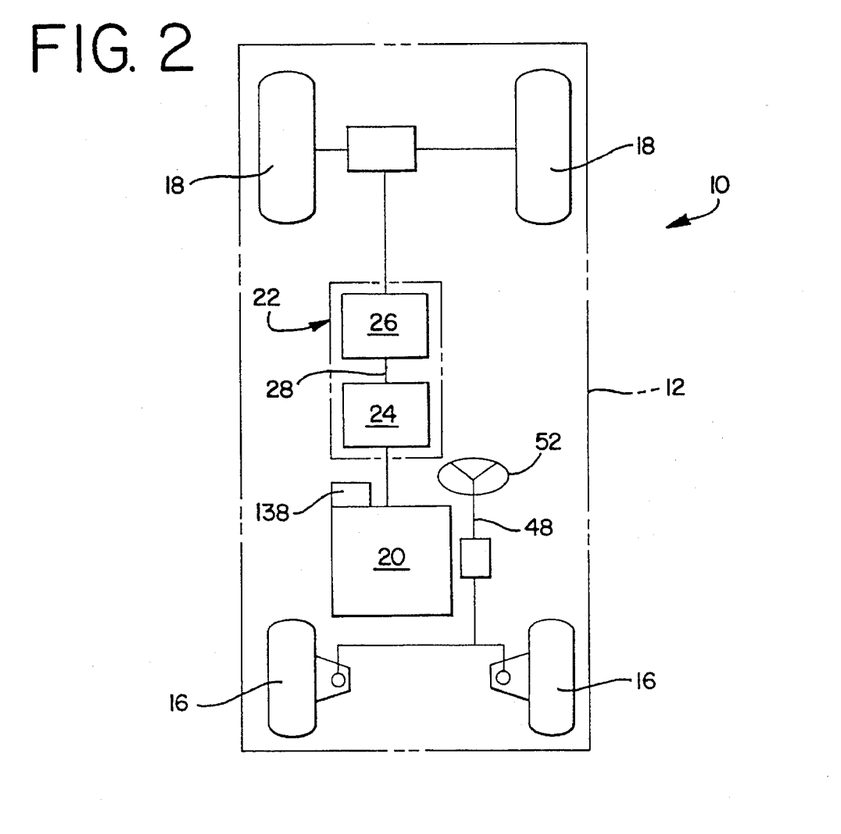
FIG. 2 is a schematic diagram of the implement shown in FIG. 1.

As shown in FIG. 2, the implement 10 further includes a conventional self-propelled engine 20 which is connected to a transmission assembly 22 in a manner well known in the art. In the illustrated embodiment, the transmission assembly 22 includes a speed transmission 24 and a range transmission 26 which are drivingly interconnected to each other. In the illustrated embodiment, the speed transmission 24 receives power from the engine. A suitable drive shaft 28 acts as an output for the speed transmission 24 and as an input for the range transmission 26. In the illustrated embodiment, the output of the range transmission 26 serves to drive the rear wheels 18 of the implement 10.

The speed transmission 24 is mounted to the implement frame 12 and has a conventional gearing arrangement including a plurality of gear meshes. In the illustrated embodiment, the speed transmission 24 includes four different gear meshes or gear combinations such that the speed transmission 24 is capable of developing at least four different speeds between input and output ends thereof.

The range transmission 26 is likewise mounted to the implement frame 12 and has a conventional gearing arrangement including a plurality of gear meshes. In the illustrated embodiment, the range transmission 24 includes four different gear meshes or combinations such that the range transmission 26 is capable of developing four different ranges between input and output ends thereof. Since the speed transmission 24 and range transmission 26 are arranged in combination relative to each other, the off-highway implement is capable of developing up to sixteen different speed ranges.

Figure 3:
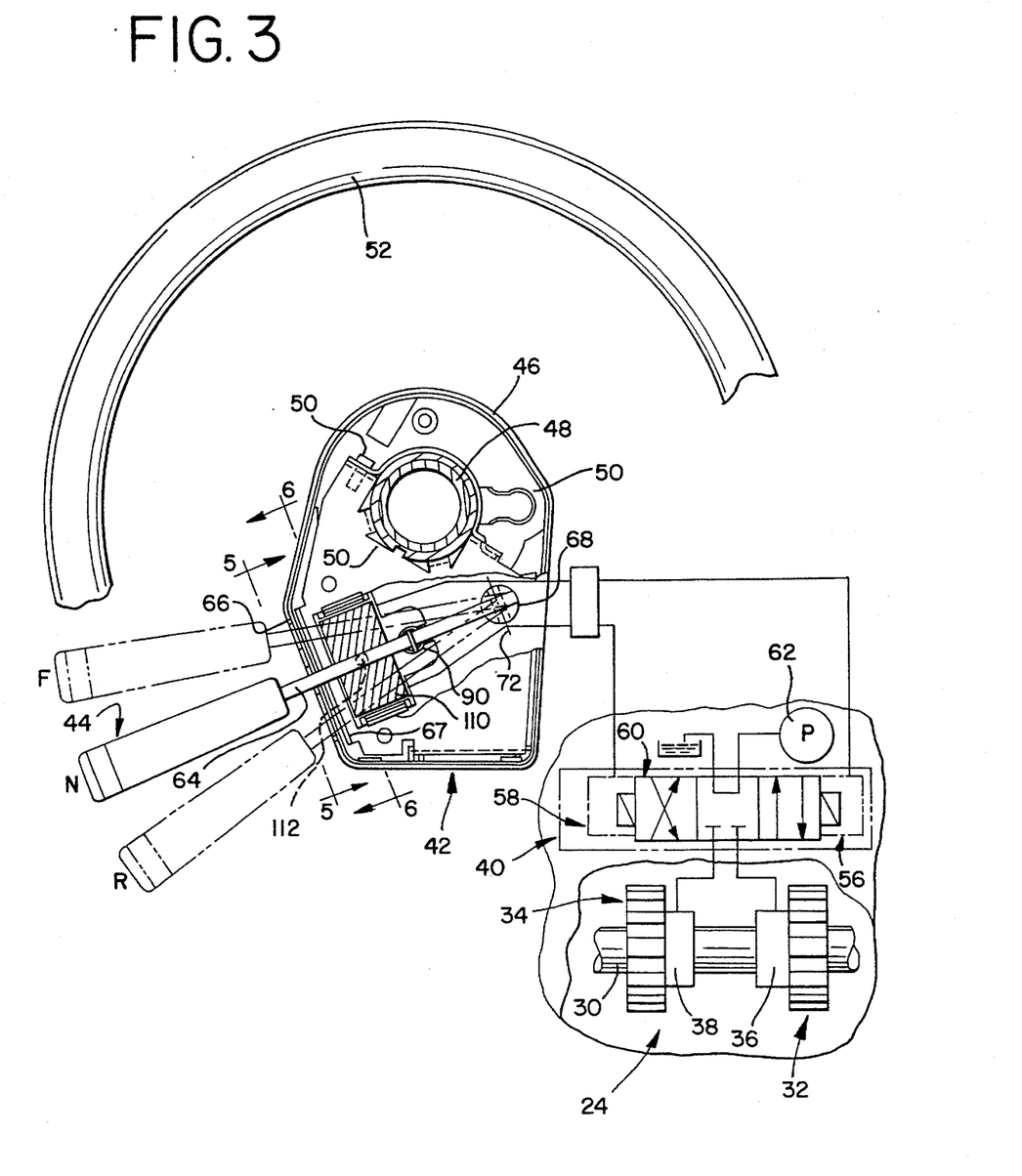
FIG. 3 is a diagrammatic illustration of a drive control system according to the present invention in which forward/neutral/reverse modes of operation for the off-highway implement are engaged by hydraulically operated clutches whose hydraulic clutch engaging pressure is controlled by a controller.

A fragmentary illustration of the transmission 24 is shown in FIG. 3. As illustrated, the transmission 24 includes a shaft 30 on which a forward drive arrangement 32 and a reverse drive arrangement 34 are mounted. As known in the art, a forward clutch 36 is arranged in combination with the drive arrangement 32 for establishing a forward mode of operation for the transmission thus moving the implement forward. As is known in the art, a reverse clutch 38 is arranged in combination with the drive arrangement 34 for establishing a reverse mode of operation from the transmission thus moving the implement in reverse.

As schematically represented in FIG. 3, the directional control system of the present invention includes a controller 40 for conditioning the transmission assembly 22 to operate in either a forward, neutral, or reverse mode of operation in response to control signals applied thereto. The directional control system of the present invention also includes a directional assembly 42 having a directional selector 44 which is movable to any of three different positions corresponding to forward, neutral, and reverse modes of operation for the implement. The directional selector 44 is preferably arranged within the cab region 14 of the implement within easy reach of the operator to facilitate efficient and effective control over the direction of the implement during operation.

The directional assembly 42 further includes a housing 46 which is preferably affixed to a steering column 48, as with fastener 50, so as to be readily accessible to the operator in the cab region 14 of the implement. As shown in FIGS. 2 and 3, a steering wheel 52 is affixed to the upper end of and combines with the steering column 48 to define a steering mechanism that provides steering directions to the implement 10. Suffice it to say, the steering mechanism is preferably of the type described and illustrated in U.S. Pat. No. 3,799,569 the full disclosure of which is incorporated herein be reference.

The controller 40 includes a forward actuator 56 (FIG. 7) for conditioning the forward clutch 36 to operate the transmission assembly 12 of the implement in a forward mode of operation and a reverse actuator 58 (FIG. 7) for conditioning the reverse clutch 38 to operate the transmission assembly 12 of the implement in a reverse mode of operation. In a preferred form of invention, the controller 40 includes a spring centered three position electro/hydraulic valve assembly 60 interposed between a hydraulic pump 62 and the forward and reverse clutches 36 and 38, respectively.

Figure 7:
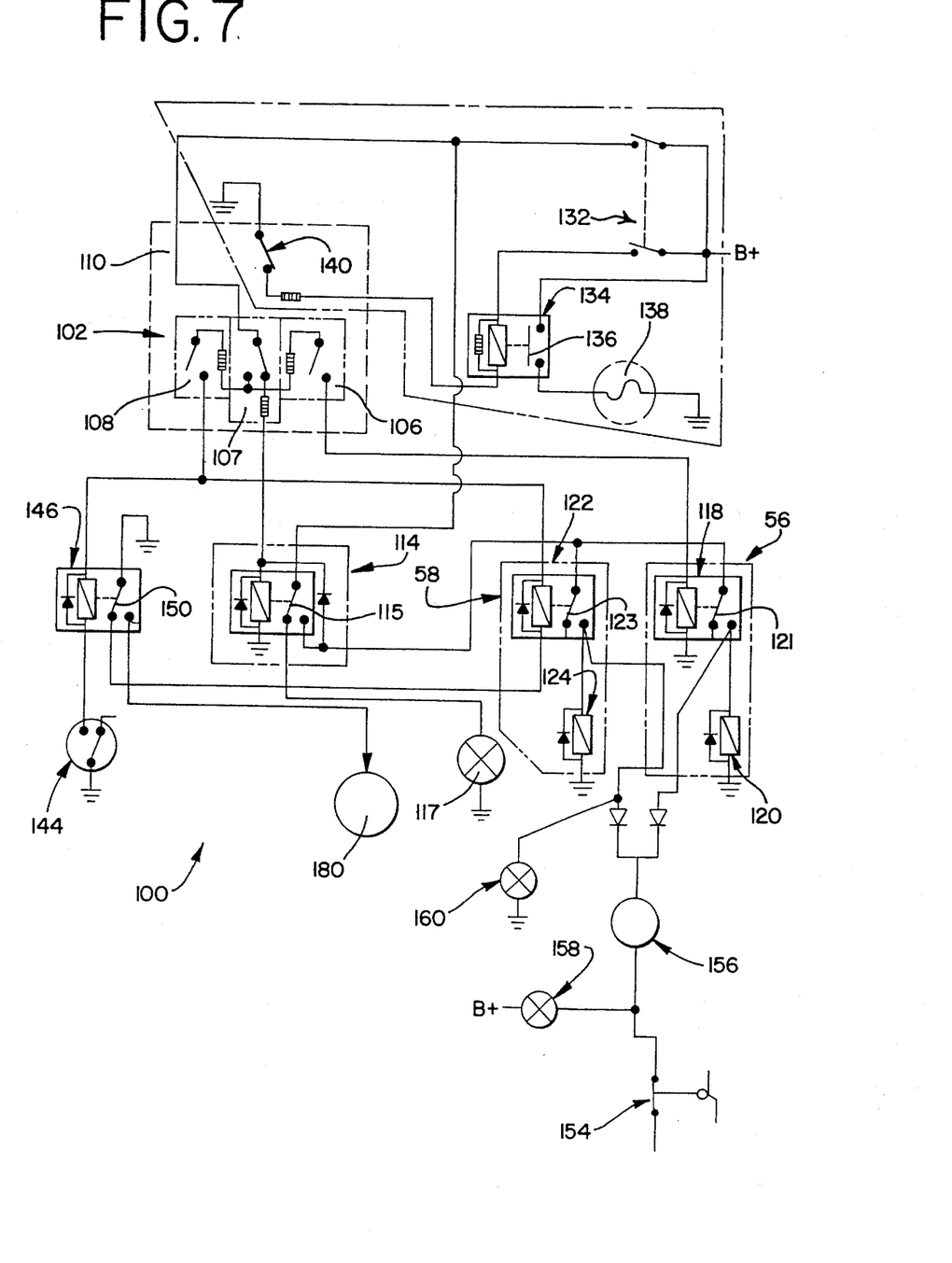
FIG. 7 is an electrical schematic for the directional control system of the present invention.

In a forward position, the valve assembly 60 is positioned to direct fluid flow from the pump 62 to the forward clutch 36 thereby conditioning the implement for a forward mode of operation. In a reverse position, the valve assembly is positioned to direct fluid from the pump 62 to the reverse clutch thereby conditioning the implement for a reverse mode of operation. In a spring centered neutral position, the valve assembly 60 is positioned to interrupt fluid flow between the pump 62 and either of the clutches 36, 38 thereby conditioning the implement for a neutral mode of operation.

In a preferred form of the invention, the directional selector 44 of the directional assembly 42 comprises a selector lever 64, which is movable under the influence of the operator, between forward, neutral, and reverse positions corresponding to forward, neutral, and reverse modes of operation for the implement 10, respectively. As shown in FIG. 3, the selector lever 64 has a first end swivably mounted to the housing 46 of the directional assembly 42 and a second end which extends through an opening or gate 66. Intermediate its ends, the selector lever 64 preferably has a generally circular cross-sectional configuration.

Figure 4:
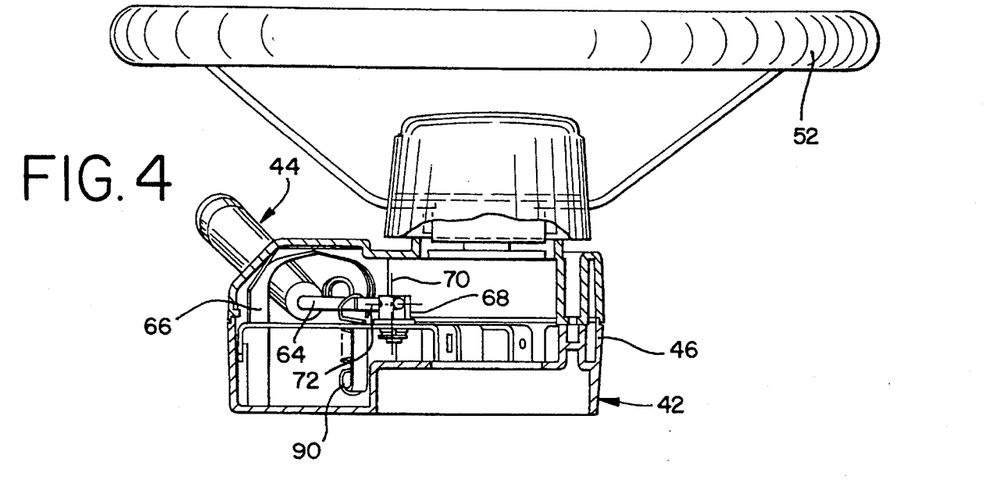
FIG. 4 is a fragmentary side elevational view, partially broken away, of the directional control system illustrated in FIG. 3.

As shown in FIGS. 3 and 4, the first end of the selector lever 64 is connected to a generally vertical upstruck shaft 68 which is supported by the housing for rotational movement about a generally vertical axis 70. The selector lever 64 is pivotally connected to the shaft 68 for movement about a second generally horizontal axis 72.

Figure 5:
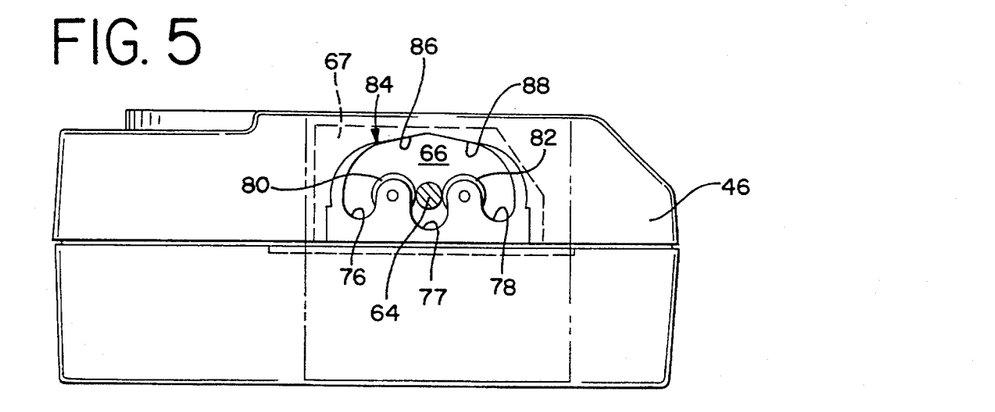
FIG. 5 is a side elevational view of the directional control system taken along line 5—5 of FIG. 3.

Movement of the selector lever is restricted by the gate 66 preferably defined by a slotted plate 67 carded in the housing 46. As best shown in FIGS. 4 and 5, the gate or opening 66 is elongated in a sideways direction and the selector lever 64 extends endwise therethrough. The gate or opening 66 defines forward, neutral, and reverse spaced but joined detents 76, 77 and 78, respectively, arranged in side-by-side relation relative to each other. Each detent preferably has a teardrop configuration such that the selector lever 64 is required to be moved conjointly about both axes 70, 72 to effect movement of the lever 64 from one detent to another to cause a change in the mode of operation of the implement.

In a most preferred form of the invention, the ingress opening to the neutral detent 77 has rollers 80, 82 provided at substantially similar elevations and on opposite sides thereof. The lateral spacing between the rollers 80, 82 proximates the cross-sectional configuration of the lever 64 with each roller 80, 82 being rotatably carried on the housing 46 or plate 66. Moreover, the gate or opening 66 defines a convex camming surface 84 arranged opposite to the detents 76, 77 and 78. The camming surface 84 includes angularly diverging surfaces 86 and 88 which are joined at a location across from and generally centered on the neutral detent 77 to facilitate movement of the selector lever 64 to a neutral position. As shown in FIGS. 3 and 4, a spring 90 is connected to the housing 46 and intermediate the ends of the lever 64. The spring 90 is arranged in general alignment with the shaft 68 and the neutral detent 77 for normally urging the lever 64 toward a neutral position and impeding movement of the lever 64 to either of the other two detents 76, 78 until purposefully moved by the operator to change the operating mode of the implement.

The control signals for operating the controller 40 and thereby controlling the direction of the implement are derived from an electrical system 100 schematically represented in FIG. 7. The electrical system 100 is connected between an electrical power source B+ such as the battery on the implement and the controller 40 (FIG. 3). The electrical system 100 includes a sensor assembly 102 for monitoring the position of the directional selector lever 64 and for applying control signals to the forward and reverse actuators 56 and 58, respectively, of the controller 40 as a function of the position of the selector lever 64.

In a preferred form of the invention, the sensor assembly 102 is connected to the electrical power source and includes forward, neutral and reverse switches 106, 107 and 108, respectively, which individually respond to the selector lever 64 being positioned in forward, neutral and reverse positions, respectively. Preferably, the switches 106, 107 and 108 are completely sealed within a switch module 110 mounted within the housing 46 of the directional assembly 42.

Figure 6:
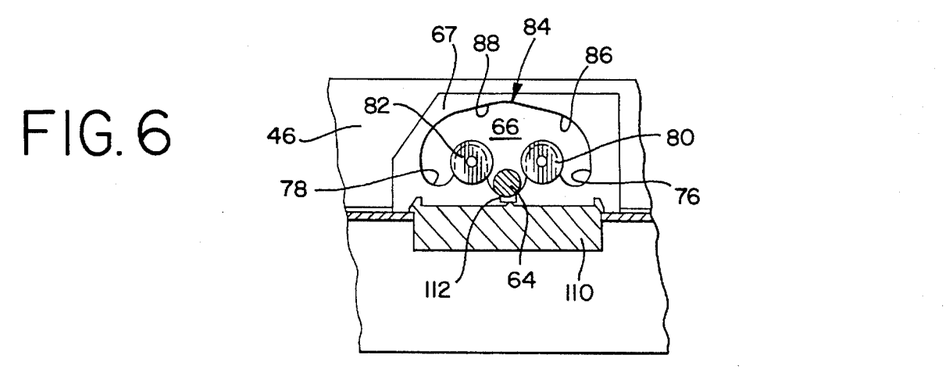
FIG. 6 is a fragmentary side elevational view taken along line 6—6 of FIG. 3.

In a most preferred form of the invention, each switch 106, 107 and 108 is configured as a reed switch. As shown in FIGS. 3 and 6, the directional selector lever 64 carries a magnet 112 thereon that serves as a switch actuator for and when arranged proximate to each switch 106, 107 or 108. The magnet or switch actuator 112 is operable to effect the state of any one of the switches 106, 107 and 108 when the selector lever 64 is positioned in one of the detents. Returning to FIG. 7, each reed switch has a resistor associated therewith to protect the switch from an overload current condition. That is, the resistor associated with each switch will open if a direct short across the switch occurs.

As shown in FIG. 7, the neutral switch 107 is connected to a latching relay 114. The forward switch 106 is connected to the forward actuator 56. The reverse switch 108 is connected to the reverse actuator 58.

The latching relay 114 is connected to the electrical power source through the neutral switch 107 as long as the selector lever 64 is in a neutral position. The latching relay 114 includes a contact 115. In the illustrated embodiment, one side of the latching relay contact 115 is connected to the accessory switched power source. The other side of the relay contact 115 is connected to either a "Not-In-Neutral" indicator 117 or to the forward and reverse actuators 56 and 58. That is, when the relay 114 is not energized, the latching relay contact 115 is positioned to connect the indicator 117 to the power source to provide a visual indication that the directional control of the present invention needs to be moved to a neutral position prior to starting of the engine. When the latching relay is energized, the contact 115 changes state from the position shown and serves to direct power to the forward and reverse actuators 56, 58, respectively.

In the illustrated embodiment, the forward actuator 56 includes a relay 118 connected to the latching relay 114 and to an electrical solenoid 120. Upon energization of the relay 118, a contact 121 changes state from that shown to energize the solenoid 120 and thus position the valve assembly 60 (FIG. 3) to connect the pump 62 to the forward clutch 36 thereby conditioning the transmission assembly 22 for a forward mode of operation. In the preferred embodiment, the contact 121 of the forward relay 118 is normally positioned to effectively disconnect the solenoid valve 120 from becoming energized until the relay 118 is energized.

In the illustrated embodiment, the reverse actuator 58 includes a relay 122 connected to the latching relay 114 and to an electrical solenoid 124. Upon energization of the relay 122, a contact 123 changes state from that shown to energize the solenoid 124 and thus position the valve assembly 60 (FIG. 3) to connect the pump 62 to the reverse clutch 38 thereby conditioning the transmission assembly for a reverse mode of operation. In the preferred embodiment, the contact 123 of the reverse relay 122 is normally positioned to effectively disconnect the solenoid valve 124 from becoming energized until the relay 122 is energized.

The electrical system 100 may further include a starting circuit 130 which is connected to the electrical power source B+ for starting the engine 20 of the implement. The starting circuit 130 includes a manually actuated key switch 132 which is connected to the power source and to a starting relay 134. The starting relay 134 is connected to the power source and to a starter 138 on the engine 20 (FIG. 2). The starting relay 134 further includes a contact 136 which serves to connect the starter 138 to the power source upon energization of the relay 134 and closure of the key switch 132. The starting relay 134 is furthermore connected to a normally closed neutral switch 140.

In the illustrated embodiment, the neutral switch 140 forms part of the switch module 110 and is responsive to the position of the selector lever 64 relative to a neutral position. The neutral switch 140 is preferably in the form of a reed switch having a resistor associated therewith to guard against overload current conditions for the switch 140. As is conventional, the resistor associated with switch 140 will open if there is a direct short across the switch 138.

In the illustrated embodiment, when the selector lever 64 is in a neutral position, the switch 140 is connected to ground so as to complete the starting circuit after the key switch 132 is closed. If the selector lever 64, however, is in other than the neutral position, the neutral switch 140 will be in an open position thus disabling the starting circuit and thereby preventing the engine 20 from starting.

The electrical system of the present invention is further configured to prevent engagement of the transmission assembly 22 in a fourth speed range as long as the selector lever 64 is positioned to condition the implement in a reverse mode of operation. To effect these ends, the electrical system of the present invention includes a fourth speed range switch or indicator 144 which is connected to ground and to a relay 146. The relay 146 is connected between the switch 144 and the reverse switch 108 of the switch module 110. In the illustrated embodiment, the switch 144 is normally open as long as the transmission assembly 22 operates in other than a fourth speed range. In the present invention, the switch 144 is responsive to shifting movements of the range transmission into the fourth range of operation. As shown in FIG. 7, the contact 150 of the relay 146 serves to normally connect the relay 122 of the reverse actuator 58 to ground.

In the illustrated embodiment, the implement 10 is provided with a conventional park brake for inhibiting movement of the implement when the implement is conditioned in a neutral mode of operation. As shown in FIG. 7, a park brake switch 154 is associated with and senses the operative condition of the park brake. When the park brake is applied, switch 154 is closed and when the park brake is not applied, the switch 154 is open. An alarm 156 is connected to the relays 118 and 122 of the forward and reverse actuators 56 and 58, respectively. The alarm 156 is likewise connected to ground as through the switch 154.

If either the forward or reverse actuators 56 or 58, respectively, are actuated with the park brake applied, the alarm 156 will be energized. In the illustrated embodiment, the alarm 156 provides an audible indication of the actuation of either the forward or reverse actuators 56 or 58 and application of the hand brake or park brake. Moreover, an indicator 158 may likewise be actuated in the same manner. The indicator 158 is preferably arranged in the cab region 14 of the implement and provides a visual indication of actuation of one of the forward and reverse actuators 56 and 58 and application of the park brake.

The electrical system of the present invention may also include a reverse indicator 160 for providing an indication of when the implement is operated in a reverse mode of operation. The indicator 160 is preferably arranged in the cab region of the implement and is connected to the reverse actuator 54 for providing a visual indication of when a reverse mode of actuation has been chosen for the implement.

To ensure complete understanding of the present invention, a brief description of its operation is as follows. As long as the selector lever 64 is in a neutral position, indicative of a neutral mode of operation for the implement, the starting circuit 130 for the implement will be completed upon closure of the key switch 132. That is, with the selector lever 64 in a neutral position, the neutral switch 140 will connect the starting relay 134 to ground. Thus, when the key switch 132 is closed, the starting relay 134 will be energized thereby the contact 136 connects the starter 138 to the power source thus starting the engine. As will be appreciated, if the selector lever 64 is in other than a neutral position, the neutral switch 140 will disable the starting circuit thus preventing the engine from being started until the selector lever 64 is returned to a neutral position.

With the selector lever 64 in a neutral position, the switch actuator 112 on the selector lever 64 will be positioned to close the neutral switch 107 as shown in FIG. 7. With the neutral switch 107 closed, the latching relay 114 will be energized thus causing contact 115 of the latching relay 114 to change state. Upon energization of the latching relay 114, contacts 121 and 123 of the forward and reverse relays 118 and 122, respectively, are connected to the power source. Because the selector lever 64 is in a neutral position, however, the forward and reverse switches 106 and 108, respectively, of the switch module 110 are both ineffective to energize either the forward or reverse relays 118, 122, respectively. Thus, neither the forward actuator 56 nor the reverse actuator 58 are energized to condition the controller to move the implement. With neither the forward nor reverse actuators 56, 58, respectively energized, the valve assembly 60 is spring centered in a neutral position to effectively disconnect the pump 62 from either of the clutches 36, 38 and thus the transmission assembly 22 is in a neutral condition and the implement operates in a neutral mode of operation.

When the operator desires to condition the implement for a forward mode of operation, the selector lever 64 is removed from its neutral position and moved into the forward detent 76. When the selector lever 64 is moved into a forward position, the switch actuator 112 which moves with the lever 64 causes the forward and neutral switches 106 and 107, respectively, to change state. As will be appreciated, although the neutral switch 107 changes state, the contact 115 of the latching relay 114 remains in a latched state to connect the power source to both the forward and reverse actuators 56 and 58, respectively. A change in state of the forward switch 106, serves to energize the forward relay 118. Energizing the forward relay 118 causes the contact 121 thereof to change state thus energizing the forward solenoid 120. Energizing the forward solenoid causes the valve assembly 60 to shift into a position such that fluid from the hydraulic pump 62 is delivered to the forward clutch 36 thereby conditioning the implement for a forward mode of operation. As will be appreciated from the above, and in the embodiment illustrated, when the control or key switch 132 is moved to an open position, the engine of the implement will stop. With the control or key switch 132 in an open position, the power source B+ is operably disconnected from the electrical system. Accordingly, the sensor assembly 102 and the latching relay 114 are each disconnected from the power source. Thus, the contact 115 of the latching relay 114 returns to the position illustrated in FIG. 7.

When the control or key switch 102 is again moved to the closed position to start the engine, and as mentioned above, if the selector lever 64 is in other than the neutral position, the neutral switch 140 will be in an open position thus disabling the starting circuit and thereby preventing the engine from starting. Moreover, the electrical circuit of the present invention requires the selector lever 64 to be reset to a neutral position before the forward and reverse actuators 56 and 58, respectively, can again be enabled through the latching relay 114. That is, with the preferred embodiment of the electrical system the latching relay 114 must be reset in order to enable the actuators 56 and 58 and, in the preferred form of the present invention, the latching relay 114 can only be reset through movement of the selector lever 64 to a neutral position.

When the operator desires to condition the implement for a reverse mode of operation, the selector lever 64 is moved into the reverse detent 78. When the selector lever 64 is moved into a reverse position, the switch actuator 112 which moves with the lever 64 causes the switch module to change state from either a neutral or forward condition. A change in state of the reverse switch 108 serves to energize the reverse relay 122. Energizing the reverse relay 122 causes the contact 123 thereof to change state thereby energizing the reverse solenoid 124. Energizing the reverse solenoid 124 causes the valve assembly 60 to shift into position such that the output of the hydraulic pump 62 is connected to the reverse clutch 38 thus conditioning the implement for a reverse mode of operation.

Notably, the relay 122 of the reverse actuator 58 is normally grounded as through contact 150 of the relay 146. As long as the transmission assembly 22 operates in other than a fourth speed range, the fourth range switch 144 remains open. Should the transmission assembly 22 be conditioned into a fourth speed range, however, the switch 144 changes state thus connecting the relay 146 to ground.

The electrical system 100 of the present invention is preferably configured such that power is delivered to both the reverse actuator 58 and the relay 146 when the selector lever 64 is positioned to condition the implement for a reverse mode of operation. With the relay 146 connected to ground as through the fourth range switch 144, the contact 150 changes state. Thus, the reverse relay 122 of the reverse actuator 58 is no longer connected to ground, thus disabling the reverse actuator from moving the valve assembly 60 into position to condition the implement for a reverse mode of operation. As long as the transmission assembly 22 is conditioned for a fourth range of operation and the selector lever 64 is positioned to operate the implement in a reverse mode of operation, the reverse actuator 58 will be "locked out" thus preventing the implement from operating in a reverse mode of operation during a fourth speed range. Of course, as soon as the range transmission 26 is shifted away from the fourth range, the fourth range switch 144 again changes state thus effectively allowing the reverse actuator 56 to condition the implement for a reverse mode of operation.

In a preferred form of the invention, an indicator 180 is provided in combination with the relay 146. That is, when the contact 150 of the relay 146 changes state from the condition shown, the indicator 180 is enabled. The indicator is preferably arranged in the cab region 14 of the implement so as to provide an indication that the fourth speed range is "locked out" as long as the range transmission 26 is conditioned in a fourth speed range and the selector lever 64 is positioned to operate the implement in a reverse mode of operation.

The cab region 14 of the implement has relatively tight space constraints because of various control mechanisms, i.e., the steering wheel, shift mechanisms, and etc. that are compactly arranged in the area. Therefore, that portion of the selector lever 64 that extends beyond the housing 46 of the control assembly is susceptible of being snagged or otherwise engaged by the operator moving about the cab region of the implement. As discussed, movement of the selector lever 64 readily results in a change in the mode of operation of the implement. In view of the above, the control system of the present invention is provided with the forward, neutral and reverse detents 76, 77 and 78, respectively, which positively maintain the selector lever 64 in the position chosen by the operator. As will be appreciated, the spring 90 of the control assembly tends to pull the selector lever 64 into the chosen detent. Moreover, and as will be appreciated by those skilled in the art, the rollers 80, 82 arranged in combination with the neutral detent combine with the spring 90 and tend to positively locate the selector lever 64 in a neutral position unless purposefully moved by the operator to other than a neutral position. With the present invention, purposeful movement of the shift lever 64 requires movement about two separate axes. Moreover, the gate or opening 66 is provided with a camming surface 84 which facilitates location of the shifting lever to a neutral position.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A directional control system for an off-highway implement including a self-propelled engine with a transmission assembly connected thereto, said transmission assembly being selectively shiftable to any of four different speed ranges, said control system comprising:

an electrical power source;

a starting circuit connected to said power source for starting the engine upon closure of a switch that is movable between open and closed positions;

a directional selector movable to one of three different positions corresponding to forward, neutral, and reverse modes of operation for the implement;

a controller for conditioning said transmission assembly to operate in either a forward, neutral, or reverse mode of operation in response to control signals applied thereto, said controller including a forward actuator for conditioning said transmission assembly to operate said implement in a forward mode of operation and a reverse actuator for conditioning said transmission assembly to operate said implement in a reverse mode of operation; and an electrical system connected to said power source through said switch, said electrical system comprising a sensor assembly for monitoring the position of the directional selector and for applying control signals to said controller as a function of the position of said directional selector, said electrical system further comprising circuitry for disabling said starting circuit from starting the engine when said sensor assembly monitors that the directional selector is in other than a neutral position and for preventing operation of either actuator following closure of said switch until said directional selector is moved to said neutral position.

2. The directional control system according to claim 1 wherein said directional selector comprises a shift lever which is movable under an influence of operator between forward, neutral, and reverse positions corresponding to forward, neutral, and reverse modes of operation for the implement.

3. A directional control system for an off-highway implement including a self-propelled engine with a transmission assembly connected thereto, said transmission assembly being selectively shiftable to any of four different speed ranges, said control system comprising:

an electrical power source;

a starting circuit connected to said power source for starting the engine;

a directional selector movable to one of three different positions corresponding to forward, neutral, and reverse modes of operation for the implement;

a controller for conditioning said transmission assembly to operate in either a forward, neutral, or reverse mode of operation in response to control signals applied thereto, said controller including a forward actuator for conditioning said transmission assembly to operate said implement in a forward mode of operation and a reverse actuator for conditioning said transmission assembly to operate said implement in a reverse mode of operation;

an apparatus for detecting when said transmission assembly is in a fourth speed range; and an electrical system connected to said power source, said electrical system comprising a sensor assembly for monitoring the position of the directional selector and for applying control signals to said controller as a function of the position of said directional selector, said electrical system further comprising circuitry for disabling said starting circuit from starting the engine when said sensor assembly monitors that the directional selector is in other than a neutral position, and wherein said circuitry is responsive to said detecting apparatus and to said sensor assembly for preventing the transmission assembly from operating in a reverse mode of operation when said apparatus detects said transmission is in a fourth speed range and said directional selector is positioned to operate the implement in a reverse mode of operation.

4. The directional control system according to claim 1 wherein said controller comprises an electro/hydraulic valve assembly for controlling fluid flow to the transmission assembly and thereby conditioning in which mode of operation the transmission assembly operates, and wherein the forward actuator of said controller includes a relay connected to a solenoid valve that responds to electrical signals directed from said directional selector monitoring sensor, with the reverse actuator of said controller including a relay that is connected to a solenoid valve that responds to electrical signals directed from said directional selector monitoring sensor.

5. A directional control system for an off-highway implement including a self-propelled engine with a transmission assembly connected thereto, said transmission assembly being selectively shiftable to any of four different speed ranges, said control system comprising:

an electrical power source;

a starting circuit connected to said power source for starting the engine;

a directional selector movable to any of three different positions corresponding to forward, neutral, and reverse modes of operation for the implement, with said directional selector comprising a shift lever which is movable under influence of an operator between forward, neutral, and reverse positions corresponding to forward, neutral, and reverse modes of operation for the implement, and wherein said shift lever carries a magnet thereon;

a controller for conditioning said transmission assembly to operate in either a forward, neutral, or reverse mode of operation in response to control signals applied thereto, said controller including a forward actuator for conditioning said transmission assembly to operate said implement in a forward mode of operation and a reverse actuator for conditioning said transmission assembly to operate said implement in a reverse mode of operation; and an electrical system connected to said power source, said electrical system comprising a sensor assembly for monitoring the position of the directional selector and for applying control signals to said controller as a function of the position of said directional selector, said sensor assembly comprising a switch module connected to the electrical power source and comprised of a forward reed switch connected to the forward actuator of the controller and which responds to the presence of the magnet when the shift lever is positioned in a forward position, a reverse reed switch connected to the reverse actuator of the controller and which responds to the presence of magnet when said shift lever is positioned in the reverse position, and a neutral reed switch which responds to the presence of the magnet when the shift lever is positioned in a neutral position, said electrical system further comprising circuitry for disabling said starting circuit from starting the engine when said sensor assembly monitors that the directional selector is in other than a neutral position.

6. The directional control system according to claim 1 wherein said starting circuit includes a relay connected to a key switch, said starting circuit being enabled when said key switch is in a closed position and said direction selector monitoring sensor detects that said directional selector is in a neutral position.

7. The directional control system according to claim 3 wherein said detecting apparatus includes a two-position switch which changes state when the transmission assembly is shifted into the fourth speed range, said two-position switch being arranged in combination with said sensor for monitoring the position of said directional selector to disable the reverse actuator from conditioning said transmission assembly to operate in a reverse mode of operation when the transmission assembly is in the fourth speed range.

8. The directional control system according to claim 3 further including an indicator connected to said detecting apparatus for providing a visual indication that the fourth speed range is unobtainable with the directional selector in the reverse position.

9. A directional control system for an off-highway implement including a self-propelled engine with a transmission assembly connected thereto, said transmission assembly being selectively shiftable to any of four different speed ranges, said control system comprising:

an electrical power source;

a starting circuit connected to said power source for starting the engine;

a directional selector movable to one of three different positions corresponding to forward, neutral, and reverse modes of operation for the implement;

a controller for conditioning said transmission assembly to operate in either a forward, neutral, or reverse mode of operation in response to control signals applied thereto, said controller including a forward actuator for conditioning said transmission assembly to operate said implement in a forward mode of operation and a reverse actuator for conditioning said transmission assembly to operate said implement in a reverse mode of operation;

an electrical system connected to said power source, said electrical system comprising a sensor assembly for monitoring the position of the directional selector and for applying control signals to said controller as a function of the position of said directional selector, said electrical system further comprising circuitry for disabling said starting circuit from starting the engine when said sensor assembly monitors that the directional selector is in other than a neutral position; and an alarm that is connected to the sensor assembly of the electrical system and that is activated when the directional selector is in other than a neutral position and a handbrake on the off-highway implement is applied.

10. The directional control system according to claim 9 further including an indicator for providing a visual indication of when the hand brake is applied.

11. The directional control system according to claim 10 further including an indicator connected to said reverse actuator for providing a visual indication that the directional selector is in a position to condition the transmission assembly to operate in a reverse mode of operation.

12. The directional control system according to claim 3 wherein said directional selector monitoring sensor assembly comprises a first switch for detecting movement of the directional selector relative to a neutral position, a second switch for detecting movement of the directional selector relative to a reverse position, and a fourth switch for detecting movement of the directional selector relative to a neutral position.

13. The directional control system according to claim 12 wherein the fourth switch of said directional selecting monitoring sensor assembly is connected to a relay and to a key switch forming part of the starting circuit.

14. A directional control system for an off-highway implement having a transmission assembly which is selectively shiftable to any one of at least four speed ranges, said directional control system comprising:

an electrical power source;

a shift lever selectively movable to any one of three different positions corresponding to forward, neutral, and reverse modes of operation for the implement;

a controller for conditioning the transmission assembly to operate in a forward, neutral, or reverse mode of operation in response to control signals applied thereto, said controller including an electro/hydraulic valve assembly for controlling fluid flow to said transmission assembly and thereby conditioning in which mode of operation the transmission assembly and thereby the implement will operate, said valve assembly including a forward solenoid which is energized when the shift lever is positioned in a forward position and a reverse solenoid which is energized when the shift lever is positioned in a reverse position, and wherein neither solenoid is energized when the shift lever is positioned in a neutral position;

an electrical system connected between said power source and said controller, said electrical system including forward, neutral, and reverse switches which individually respond to the shift lever being positioned in forward, neutral, and reverse positions, respectively, a forward relay connected between said forward switch and said forward solenoid, a reverse relay connected between said reverse switch and said reverse solenoid, and a latching relay which is connected between said neutral switch and each of said forward and reverse relay for providing power to the latching relay as long as the shift lever is positioned in a neutral position prior to movement of the shift lever to either the forward or reverse positions.

15. The directional control system according to claim 14 wherein said shift lever carries a switch actuator which moves with the shift lever between positions, and wherein each of said forward, neutral, and reverse switches each include a reed switch assembly which responds to the presence of the switch actuator being arranged proximate thereto.

16. The directional control system according to claim 15 wherein the reed switch assemblies of the forward, neutral and reverse switches are commonly mounted in a switch module.

17. The directional control system according to claim 14 further including a switch assembly which responds to the transmission assembly being shifted into a fourth speed range and a relay connected to said reverse switch and to said reverse relay for disabling the transmission assembly from operating in a fourth speed range when the shift lever is positioned in a reverse position.

18. The directional control system according to claim 14 further including an alarm which operates in response to energization of either one of the forward or reverse relays as long as a hand brake of said implement is applied.

19. A directional control system for an off-highway implement having a transmission assembly which is selectively shiftable to any one of at least four speed ranges, said directional control system comprising:

an electrical power source;

a directional selector movable under the influence of an operator one of at least three different positions corresponding to forward, neutral, and reverse modes of operation for the implement, said selector being mounted such that the selector is required to be moved about two different axes to change positions;

a controller for conditioning the transmission assembly to operate in a forward, neutral, or reverse mode of operation in response to control signals applied thereto, said controller including a self-centered valve for controlling operation of the transmission assembly and thereby the implement, said controller further including a forward actuator for positioning the valve in a position to control operation of the transmission assembly in a forward mode of operation and a reverse actuator for positioning the valve in a position to control operation of the transmission assembly in a reverse mode of operation; and an electrical system connected between said power source and said controller, said electrical system including forward, neutral, and reverse switches which individually respond to the directional selector being positioned in forward, neutral, and reverse positions, respectively, a control switch for connecting said electrical system to said power source, said control switch being movable between a closed position, wherein said electrical system is powered by said power source, and an open position, wherein said electrical system is operably disconnected from said power source, said electrical system further including electronic circuitry connected between said forward, neutral, and reverse switches and said actuators for directing power to the actuators as long as the directional selector is positioned in a neutral position prior to movement of the directional selector to either the forward or reverse positions and for preventing operation of either actuator following closure of said control switch and until said directional selector is positioned in a neutral position.

20. A directional control system for conditioning a drive system of an off-highway implement between a neutral condition and either one of at least two drive conditions, said control system comprising:

a housing mounted on a steering column of the implement;

a controller for conditioning said drive system into one of the three conditions in response to electrical control signals directed thereto;

an electrical switch assembly mounted in said housing for directing electrical control signals to said controller, said electrical switch including a switch actuator movable to at least three different positions to control the signals directed by said switch to said controller as a function of the operative position of said switch actuator, with each different position of said switch actuator corresponding to a particular condition of the drive system; and a selector lever movable by a vehicle operator for controlling the operative position of the switch actuator and thereby the condition of said drive system, said lever having a first end swivably mounted in the housing and a second end extending through an opening defined by said housing to facilitate selective movement of the lever to any one of a plurality of settings corresponding to the different conditions of the drive system, the first end of said lever being connected to the housing for pivotal movement about first and second pivot axes, with said first pivot axis extending generally orthogonal to the second axis, the opening in said housing defining three spaced detents arranged in side-by-side relation relative to each other with the center detent corresponding to the neutral condition for said drive system and the other two detent positions corresponding to the two drive conditions of the drive system, each of said detents being configured such that said lever is required to be moved conjointly about both axes to effect movement of the lever from one detent to another detent to cause a change in the condition of the drive system, with the center detent having rollers mounted on opposite sides of an ingress opening to the center detent, and wherein a spring is connected to said housing and intermediate the ends of said lever in general alignment with the shaft and the neutral detent for normally urging the lever toward the neutral position and impeding said lever from moving to either of said other detents until purposefully moved by the operator to change the condition of the drive system.

21. The directional control system according to claim 20 wherein an edge of the opening opposite to the detents has surfaces which angle away from a center position which is located directly opposite to the neutral detent to facilitate movement of the selector lever to a neutral position.

\* \* \* \* \*